(12) United States Patent
Liu et al.

(10) Patent No.: US 10,747,771 B2
(45) Date of Patent: Aug. 18, 2020

(54) METHOD AND APPARATUS FOR DETERMINING HOT EVENT

(71) Applicant: Baidu Online Network Technology (Beijing) Co., Ltd., Beijing (CN)

(72) Inventors: Lu Liu, Beijing (CN); Ruifeng Wu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 217 days.

(21) Appl. No.: 16/134,681

(22) Filed: Sep. 18, 2018

(65) Prior Publication Data

US 2019/0171724 A1   Jun. 6, 2019

(30) Foreign Application Priority Data

Nov. 30, 2017   (CN) .......................... 2017 1 1239690

(51) Int. Cl.
*G06F 16/2457* (2019.01)
*G06F 16/28* (2019.01)
*G06F 16/9535* (2019.01)
*G06F 16/335* (2019.01)

(52) U.S. Cl.
CPC ...... *G06F 16/24578* (2019.01); *G06F 16/285* (2019.01); *G06F 16/335* (2019.01); *G06F 16/9535* (2019.01)

(58) Field of Classification Search
CPC ............ G06F 16/24578; G06F 16/285; G06F 16/9535; G06F 16/335

USPC ......................................................... 707/725
See application file for complete search history.

(56) References Cited

U.S. PATENT DOCUMENTS

| | | | |
|---|---|---|---|
| 9,881,090 B2 * | 1/2018 | Wang et al. .......... | G06F 16/951 |
| 2010/0113072 A1 * | 5/2010 | Gibson ................. | G06Q 20/32 |
| | | | 455/466 |
| 2011/0166950 A1 * | 7/2011 | Goldstein ............. | G06Q 30/08 |
| | | | 705/26.3 |
| 2018/0188702 A1 * | 7/2018 | Jiang ..................... | G06F 9/545 |

FOREIGN PATENT DOCUMENTS

| | | | |
|---|---|---|---|
| CN | 102508884 A | * | 6/2012 |
| CN | 103164427 A | * | 6/2013 |
| CN | 103593444 A | | 2/2014 |
| CN | 103902596 A | * | 7/2014 |
| CN | 106294619 A | * | 1/2017 |
| CN | 106649491 A | | 5/2017 |

* cited by examiner

*Primary Examiner* — Dung K Chau
(74) *Attorney, Agent, or Firm* — Seed IP Law Group LLP

(57) ABSTRACT

A method and apparatus for determining a hot event are provided. The method includes: acquiring an event list within a predetermined time period, an event in the event list including: a time period, a keyword list, and a viewpoint list; determining a theoretical heat value of the event in the event list at a current moment based on an initial heat value of the event in the event list and a current environment heat value; calculating a difference between the current heat value and the theoretical heat value for the event in the event list; and determining an event having the difference greater than a predetermined threshold as a hot event.

15 Claims, 6 Drawing Sheets

METHOD AND APPARATUS FOR DETERMINING HOT EVENT

CROSS-REFERENCE TO RELATED APPLICATIONS

This application claims priority to Chinese Patent Application No. 201711239690.6, filed on Nov. 30, 2017, titled "Method and Apparatus for Processing Hot Event," which is hereby incorporated by reference in its entirety.

TECHNICAL FIELD

Embodiments of the present disclosure relate to the field of computer technology, specifically relate to the field of computer Internet technology, and more specifically relate to a method and an apparatus for determining a hot event.

BACKGROUND

As the Internet technology develops, the openness, convenience, interactivity and other features in propagating the Internet information have given ordinary people more discourse power. However, the resulting problems online may also affect one's life and the social stability. For example, the dissemination of public opinions related to entities such as companies, organizations and Internet products may have a positive effect on the development of the entities on the whole. However, a small number of public opinions may likely cause the spread of irrational emotions on the Internet, especially during events attracting public attention, are likely to quickly become an online public opinion, and the events rise to become crisis events, thus generating serious adverse effects. Therefore, thoroughly mining online public opinion information may help enterprises or their relevant departments to identify and process content-sensitive information as soon as possible, track the development of the content-sensitive information, and guide the development of public opinions in an objective and positive direction.

The current hot event detection technology mainly mines topics manually or by topic detection and tracking (TDT), sorts the topics by the propagation trends of the topics and ranks higher-ranking events as hot events.

SUMMARY

The objective of embodiments of the present disclosure includes providing a method and an apparatus for determining a hot event.

In a first aspect, the embodiments of the present disclosure provide a method for determining a hot event, including: acquiring an event list within a predetermined time period, an event in the event list including: a time period, a keyword list, and an opinion list; determining a theoretical heat value of the event in the event list at a current moment based on an initial heat value of the event in the event list and a current environment heat value, the current environment heat value being determined based on current heat values of all events in the event list; calculating a difference between the current heat value and the theoretical heat value for the event in the event list; and determining an event having the difference greater than a predetermined threshold as the hot event.

In some embodiments, the method further includes: calculating current attention of a user to the event in the event list by adopting an attention calculation rule; and determining a hot event drawing attention of the user based on the hot event and the current attention.

In some embodiments, the acquiring an event list within a predetermined time period includes: acquiring information within the predetermined time period; and clustering the information within the predetermined time period to obtain the event list.

In some embodiments, the current environment heat value is determined by: determining a heat value of each piece of information based on a number of operating the information within the predetermined time period; determining the current heat value of the event in the event list based on the heat value of each piece of information in each viewpoint and a weight corresponding to the piece of information; and determining a weighted sum of current heat values of all events in the event list as the current environment heat value.

In some embodiments, the determining a theoretical heat value of the event in the event list at a current moment based on an initial heat value of the event in the event list and a current environment heat value includes: determining the theoretical heat value of the event in the event list at the current moment based on the initial heat value of the event in the event list, the current environment heat value, and a theoretical heat value algorithm constructed based on Newton's law of cooling.

In some embodiments, the calculating current attention of a user to the event in the event list by adopting an attention calculation rule includes: calculating theoretical attention of the user to the event in the event list based on an Ebbinghaus memory model of the user and initial attention; determining newly added attention of the user to the event in the event list, in response to a subsequent operation of the user on the information of the event in the event list; and determining, based on the theoretical attention, the newly added attention, and a preset constraint model for the newly added attention, the current attention of the user to the event in the event list at the current moment.

In some embodiments, the initial attention is set in response to an initial operation of the user to the information of the event in the event list; and/or a forgetting speed of the Ebbinghaus memory model of the user is determined based on an operation frequency of the user to the event and an operation type.

In a second aspect, the embodiments of the present disclosure provide an apparatus for determining a hot event, including: an event list acquisition unit, configured to acquire an event list within a predetermined time period, an event in the event list including: a time period, a keyword list, and an opinion list; a theoretical heat value determination unit, configured to determine a theoretical heat value of the event in the event list at a current moment based on an initial heat value of the event in the event list and a current environment heat value, the current environment heat value being determined based on current heat values of all events in the event list; a difference calculation unit, configured to calculate a difference between the current heat value and the theoretical heat value for the event in the event list; and a hot event determination unit, configured to determine an event having the difference greater than a predetermined threshold as the hot event.

In some embodiments, the apparatus further includes: a current attention calculation unit, configured to calculate current attention of a user to the event in the event list by adopting an attention calculation rule; and a user attention event determination unit, configured to determine a hot event drawing attention of the user based on the hot event and the current attention.

In some embodiments, the event list acquisition unit includes: an information acquisition unit, configured to acquire information within the predetermined time period; and an event list determination unit, configured to cluster the information within the predetermined time period to obtain the event list.

In some embodiments, the current environment heat value in the theoretical heat value determination unit is determined by: determining a heat value of each piece of information based on a number of operating information within the predetermined time period; determining the current heat value of the event in the event list based on the heat value of each piece of information in each viewpoint and a weight corresponding to the piece of information; and determining a weighted sum of current heat values of all events in the event list as the current environment heat value.

In some embodiments, the theoretical heat value determination unit is further configured to: determine the theoretical heat value of the event in the event list at the current moment based on the initial heat value of the event in the event list, the current environment heat value, and a theoretical heat value algorithm constructed based on Newton's law of cooling.

In some embodiments, the current attention calculation unit includes: a theoretical attention calculation unit, configured to calculate theoretical attention of the user to the event in the event list based on an Ebbinghaus memory model of the user and initial attention; a newly added attention determination unit, configured to determine newly added attention of the user to the event in the event list, in response to a subsequent operation of the user on the information of the event in the event list; and a current attention determination unit, configured to determine, based on the theoretical attention, the newly added attention, and a preset constraint model for the newly added attention, the current attention of the user to the event in the event list at the current moment.

In some embodiments, the initial attention in the theoretical attention calculation unit is set in response to an initial operation of the user on the information of the event in the event list; and/or a forgetting speed of the Ebbinghaus memory model of the user in the theoretical attention calculation unit is determined based on an operation frequency of the user to the event and an operation type.

In a third aspect, the embodiments of the present disclosure provide a device, including: one or more processors; and a memory, for storing one or more programs, the one or more programs, when executed by the one or more processors, cause the one or more processors to implement the method for determining a hot event according to any one of the above embodiments.

In a fourth aspect, the embodiments of the present disclosure provide a computer readable storage medium, storing a computer program thereon, the program, when executed by a processor, implements the method for determining a hot event according to any one of the above embodiments.

The method and apparatus for determining a hot event according to the embodiments of the present disclosure first acquires an event list within a predetermined time period, an event in the event list including: a time period, a keyword list, and an opinion list; then determines a theoretical heat value of the event in the event list at a current moment based on an initial heat value of the event in the event list and a current environment heat value; then calculates a difference between the current heat value and the theoretical heat value for the event in the event list; and finally determines an event having the difference greater than a predetermined threshold as the hot event. In this process, the influence of the current environment heat value on the theoretical heat value of the event is considered, and whether the event is the hot event is determined based on the difference between the current heat value of the event and the theoretical heat value, a public opinion event corresponding to an entity with few concern groups may be pre-warned in the expected escalation phase before the event spreads, thereby avoiding losses caused by the delay, and improving the accuracy of determining a hot event.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
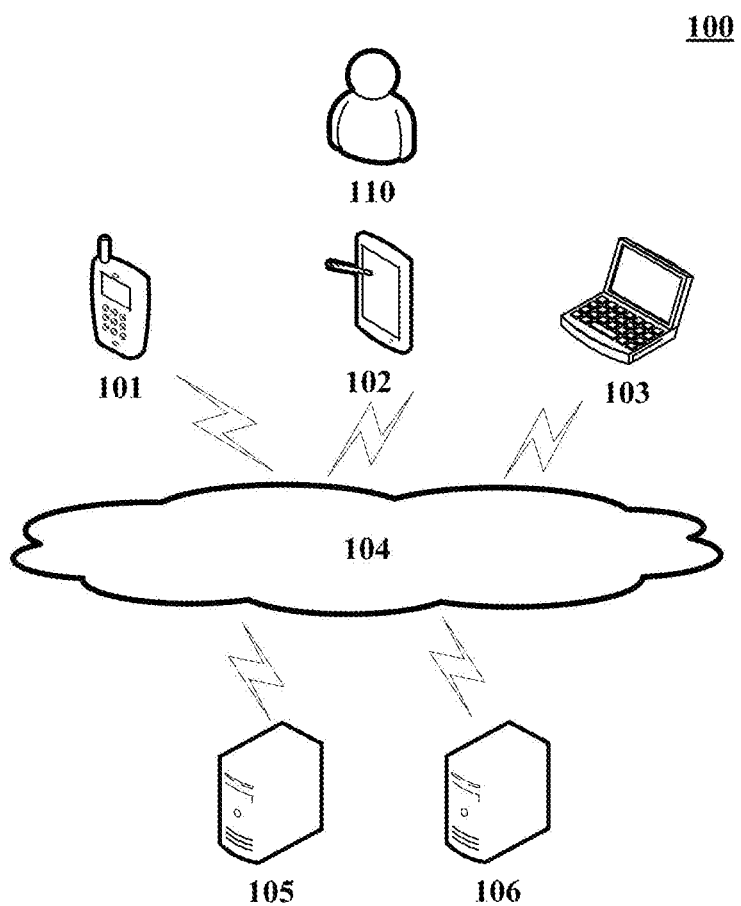
FIG. 1 is an exemplary system architecture of an embodiment of a method for determining a hot event or an apparatus for determining a hot event to which the present disclosure may be applied.

FIG. 1 shows an exemplary system architecture 100 in which a method for determining a hot event or an apparatus for determining a hot event according to the embodiments of the present disclosure is applied.

As shown in FIG. 1, the system architecture 100 may include terminal devices 101, 102 and 103, a network 104 and servers 105 and 106. The network 104 serves as a medium providing a communication link between the terminal devices 101, 102 and 103 and the servers 105 and 106. The network 104 may include various types of connections, such as wired or wireless transmission links, or optical fibers.

The user 110 may use the terminal devices 101, 102 and 103 to interact with the servers 105 and 106 through the network 104, in order to transmit or receive messages, etc. Various communication client applications, such as search engine applications, shopping applications, instant messaging tools, mailbox clients, social platform software, and video playing applications may be installed on the terminal devices 101, 102 and 103.

The terminal devices 101, 102 and 103 may be various electronic devices having display screens, including but not limited to, smart voice boxes, smart phones, wearable devices, tablet computers, e-book readers, MP3 (Moving Picture Experts Group Audio Layer III) players, MP4 (Moving Picture Experts Group Audio Layer IV) players, laptop computers and desktop computers.

The servers 105 and 106 may be servers providing various services, for example, a backend server providing a support to the terminal devices 101, 102 or 103. The backend server may perform a corresponding processing such as analysis and calculation on data, and return an analysis or calculation result to the terminal devices.

It should be noted that the method for determining a hot event according to the embodiments of the present disclosure is generally executed by the servers 105 and 106. Accordingly, an apparatus for determining a hot event is generally installed on the servers 105 and 106, or the terminal devices 101, 102 and 103.

It should be appreciated that the numbers of the terminal devices, the networks and the servers in FIG. 1 are merely illustrative. Any number of terminal devices, networks and servers may be provided based on the actual requirements.

In the Background section, the topic detection and tracking in the current hot event detection technology is mainly implemented by analyzing hot events of the whole network and then analyzing the correlation between the events and the entities, and two problems are difficult to be solved: first, public opinion events corresponding to entities drawing attention of small groups are ignored in the expected escalation phase. When the system finds the events in expected escalation phase and warns, the finding and warning often lag behind the occurrence of the event, and the entity of the event often suffers losses already; and secondly, for entities having large data volumes or drawing attention of many groups, a large number of events may flood the information pool of the user without considering whether the user is really interested in a certain event.

Figure 2:
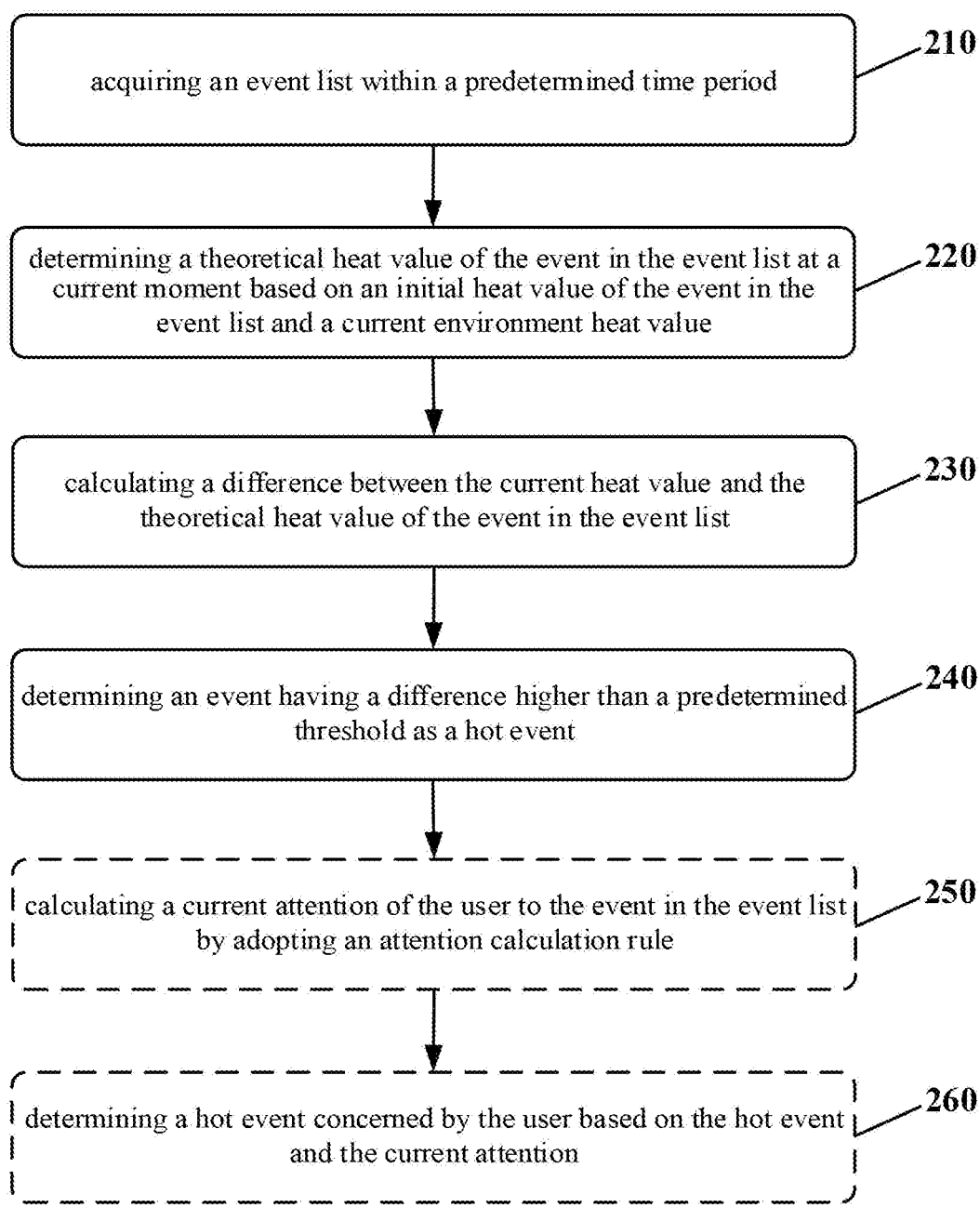
FIG. 2 is a schematic flowchart of a method for determining a hot event according to the embodiments of the present disclosure.

In view of this, referring to FIG. 2, a schematic flowchart of an embodiment of the method for determining a hot event according to the embodiments of the present disclosure is illustrated in FIG. 2.

As shown in FIG. 2, the method 200 for determining a hot event includes steps 210 to 260.

Step 210 includes acquiring an event list within a predetermined time period.

In the present embodiment, the electronic device on which the method for determining a hot event is implemented first acquires the event list within the predetermined time period. Here, the event in the event list is a high generalization or abstraction of a viewpoint having the same subject. The event may be represented as a triple, and an event triple includes: a time period, a keyword list, and a viewpoint list. Here, a viewpoint in the viewpoint list refers to a clustering of information having the same meaning expression in the data source. The viewpoint may also be expressed as a triple, and a viewpoint triple includes: time, emotion, and content description.

The event list within the predetermined time period here may be acquired from the source data for user interaction. For example, the event list may be acquired from the whole network information, from the internal training materials of enterprises, from the knowledge point data of a certain course of the school or from commodity data.

Here, the method for acquiring an event list may be implemented by using a method for acquiring an event list in the existing technology or a technology to be developed in the future, which is not limited in the present disclosure. For example, the acquiring an event list within a predetermined time period may include: acquiring information within the predetermined time period; and clustering the information within the predetermined time period to obtain the event list. Here, acquiring the event list within the predetermined time period from the whole network information is taken as an example. Network pages of the whole network in the predetermined time period may be crawled first, then neural network vectorization is performed on the information in the network pages, and then the result of the vectorization is clustered to extract the event list.

The method for clustering the result of the vectorization may be a clustering method in the existing technology or a technology to be developed in the future, which is not limited in the present disclosure. For example, the density-based clustering algorithm DBSCAN, association analysis algorithm Fp-growth or the prototype-based objective function clustering method K-means algorithm may be used to cluster the result of the vectorization.

Step 220 includes determining a theoretical heat value of the event in the event list at a current moment based on an initial heat value of the event in the event list and a current environment heat value.

In the present embodiment, a hot event detection model may determine the theoretical heat value of the event in the current event list based on the initial heat value and the current environment heat value of the event in the event list, taking into account the influence of the environment heat value on the heat dissipation of the initial heat value. Specifically, in a specific example, the theoretical heat value of the event in the event list at the current moment may be determined based on the initial heat value of the event in the event list, the current environment heat value, and a theoretical heat value algorithm constructed based on Newton's law of cooling.

The initial heat value here refers to the heat value of the event in the event list at the beginning of the current predetermined time period, and may be determined based on the number of operation on each piece of information of each viewpoint and the weight of the piece of information in the last predetermined time period. In a specific example, the heat value of the event may be determined by the following steps: first, the numbers of operating the piece of information (e.g., the number of reading a document, the number of forwarding the document, and the number of citing the document) are added and are logarithmically calculated to obtain a heat value of the piece of information. Then, the heat value of the event is obtained by adding the heat values having information temperature greater than a certain parameter (information activation parameter).

When the method for determining a hot event is performed for the first time, the current environment heat value may be used as the initial heat value of the event, and then the initial heat value may be corrected based on the actual operation and the clustered event, so that the initial heat value of the predetermined time period gets increasingly closer to the actual heat value.

The current environment heat value here may be determined based on the current heat values of all events. For example, the current environment heat value is determined based on the following steps: determining a heat value of each piece of information based on the number of operating the piece of information within the predetermined time period; determining the current heat value of the event in the event list based on the heat values of pieces of information of viewpoints and the weights corresponding to the pieces of information; and determining a weighted sum of current heat values of all events in the event list as the current environment heat value. Here, the weight corresponding to each piece of information and the weights for the weighted sum are respectively determined by an environment heat value model trained and obtained based on the sample data of historical hot events.

Step 230 includes calculating a difference between the current heat value and the theoretical heat value for the event in the event list.

In the present embodiment, the current heat value may be determined based on the heat value of each piece of information in each viewpoint of the event in the event list and the weight corresponding to the piece of information. In a specific example, as same as step 220, the heat value of the event may be determined by the following steps: first, the number of operating the information (e.g., one or more of the number of reading, the number of forwarding, the number of replying, the number of comments, and the number citing, a document) is added and is logarithmically calculated to obtain the heat value of the information. Then, the heat value of the event is obtained by adding the heat values having information temperature greater than a certain parameter (information activation parameter).

Step 240 includes determining an event having the difference greater than a predetermined threshold as a hot event.

In the present embodiment, based on the initial heat value of the event, it may be estimated that after the predetermined time period, if the event no longer continues to escalate, the heat value of the event reaches the theoretical heat value. If the difference between the actually calculated current heat value of the event and the theoretical heat value exceeds a certain threshold, then the event may be a continuous escalating event, i.e., a hot event.

Alternatively, in step 250, current attention of the user to the event in the event list may be calculated by adopting an attention calculation rule.

In the present embodiment, the attention calculation rule adopts a human memory curve of information to simulate the user attention to the event. The attention of a person or a group to a certain type of event may be measured by the frequency of acquiring information related to the event. The higher the frequency, the deeper the memory to the event; for the same reason, for events that are not of interest, the frequency of acquiring the information is very low, and the memory becomes increasingly blurred.

The pre-constructed attention calculation rule conforms to the following rule: the retained memory changes with time, which falls rapidly at the beginning and gradually tends to be a stable value. In addition, a memory curve is proposed in the rule. After a period of time, for a memory gained through learning, a part is forgotten, and a part is solidified as the maintained memory.

Based on the pre-constructed attention calculation rule, the current attention of the user to the event in the event list may be calculated.

Alternatively, in step 260, the hot event of the user attention is determined based on the hot event and the current attention.

In the present embodiment, based on the hot event determined in step 240 and the current attention determined in step 250, the hot event of the user attention may be determined. That is, the hot event list may be used as an initial recommendation list, and then the attention of the user to each hot event is determined based on the current attention. For example, for a cold start case where a new user has never operated, an initial recommendation list is provided as a final recommendation list; for an event with high event heat and low user attention, the position of the event in the recommendation list is appropriately lowered; and for an event with low event heat and high user attention, the position of the event in the recommended list is appropriately increased.

Illustratively, based on the hot event and the current attention, the determination of the hot event may be implemented using the following model:

$$S(i,j)=T(j)M(i)$$

Here, $S(i, j)$ is the score of event j in the recommendation list of user i; $T(j)$ is the current heat value of event j; and $M(i)$ is the attention of user i to event j.

With method for determining a hot event according to the above embodiment of the present disclosure a propagation model of past hot events is fitted, and early warning is performed for the public opinion events corresponding to entities with few concern groups in the expected escalation phase, so that the system can find the events in the expected escalation phase before the events are spread and perform early warning, avoiding losses caused by the delay. For different user groups, the method considers the user attention and memory level for the hot events, by learning the memory simulation of the groups to the events, and avoids the event drawing attention of the user being flooded by a large number of hot events.

Figure 3:
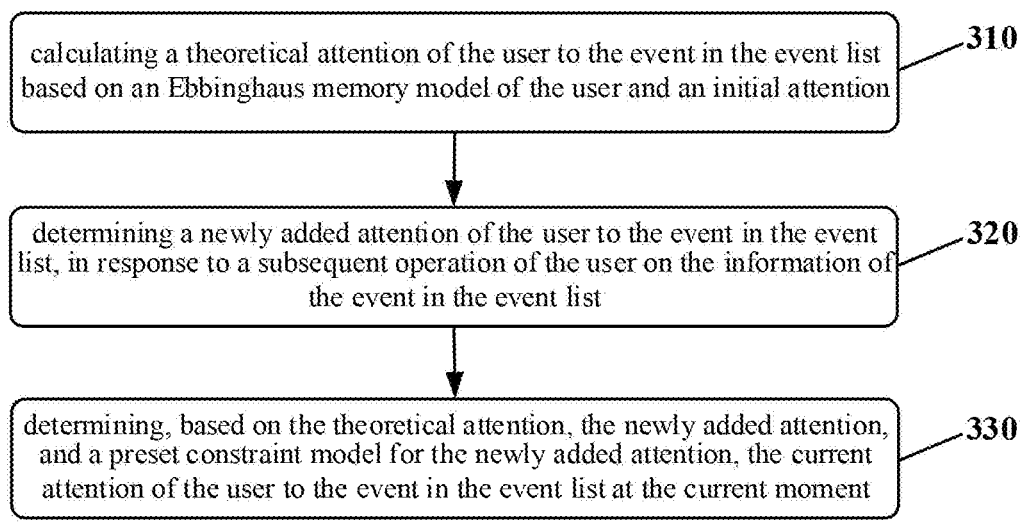
FIG. 3 is a schematic flowchart of an embodiment of a method for calculating current attention of a user to the event in the event list according to FIG. 2.

Further, referring to FIG. 3, on the basis of FIG. 2, FIG. 3 illustrates a schematic flowchart of an embodiment of a method for calculating current attention of a user to the event in the event list according to FIG. 2.

As shown in FIG. 3, the method 300 for calculating current attention of a user to the event in the event list includes steps 301 to 303.

Step 301 includes calculating theoretical attention of the user to the event in the event list based on an Ebbinghaus memory model of the user and initial attention.

In the present embodiment, the Ebbinghaus memory model has the following characteristics: after a period of time, for a memory gained through learning, a part is forgotten, and a part is solidified. The solidified part is referred to as the maintained memory. The retained memory changes with time, which falls rapidly at the beginning and gradually tends to be a stable value.

Illustratively, the Ebbinghaus memory model may be set to:

$$J(t)=e^{b}/(t+t_0)^c$$

Here, b and c are constants, in order to facilitate the training of the parameters b, c of the model, t is initialized as the initial time when reading the event by the user, and t0 represents the elapsed time since t. The output of the memory value is the result of normalizing the value calculated by $J(t)$. Specifically, when the event is operated, the time t is reset to the time when the operation is performed, and the memory value is set to 1.

In some alternative implementations of the present embodiment, the initial attention is set in response to the initial operation of the user on the information of the event in the event list.

In the present implementation, the setting of the initial attention may be determined based on a preset value. In a specific example, the initial attention may be set to 1.

Step 320 includes determining newly added attention of the user to the event in the event list, in response to a subsequent operation of the user on the information of the event in the event list.

In the present embodiment, after the user reviews, the retained memory increases, thereby achieving the new attention. Thus, the newly added attention of the user to the event in the event list may be determined in response to the subsequent operation (e.g., reading, expressing likes, comments or collection) of the user on the information of the event in the event list.

In some alternative implementations of the present embodiment, a forgetting speed of the Ebbinghaus memory model of the user is determined based on an operation frequency of the user to the event and an operation type.

In the present implementation, for the calculation of the forgetting speed, a forgetting curve may be determined based on the operation frequency of the user to the event and the operation type in the training sample, and then the forgetting speed may be determined based on the derivatives of the curves of any adjacent time intervals of repeated reviews.

Step 330 includes determining, based on the theoretical attention, the newly added attention, and a preset constraint model for the newly added attention, the current attention of the user to the event in the event list at the current moment.

In the present embodiment, in the constraint model, when the user repeatedly reviews a certain knowledge point, the amount of newly added memory is different each time, and as the review process repeats, the amount of memory of the event may not increase without limit, but may gradually stabilize until reaching a maximum value, so the attention of the user to the event in the event list changes in accordance with a negative exponential curve.

Based on the preset constraint model for the newly added attention, the theoretical attention, and the newly added attention, the current attention of the user to the event in the event list at the current moment may be determined.

For different users, each person has a different memory, thus an attention threshold may be set. It may be considered that only events with an attention greater than the threshold may be operated again by the user. Therefore, the forgetting speed of different users may be reversely deduced based on the number of events operated by the user every day, thereby achieving personalized recommendation.

The method for calculating the current attention of the user to the event in the event list according to the above embodiment of the present disclosure may simulate the Ebbinghaus memory curve to calculate the current attention of the user to the event in the event list on the basis of the embodiment shown in FIG. 2, thereby improving the accuracy of determining the attention of the user.

Figure 4:
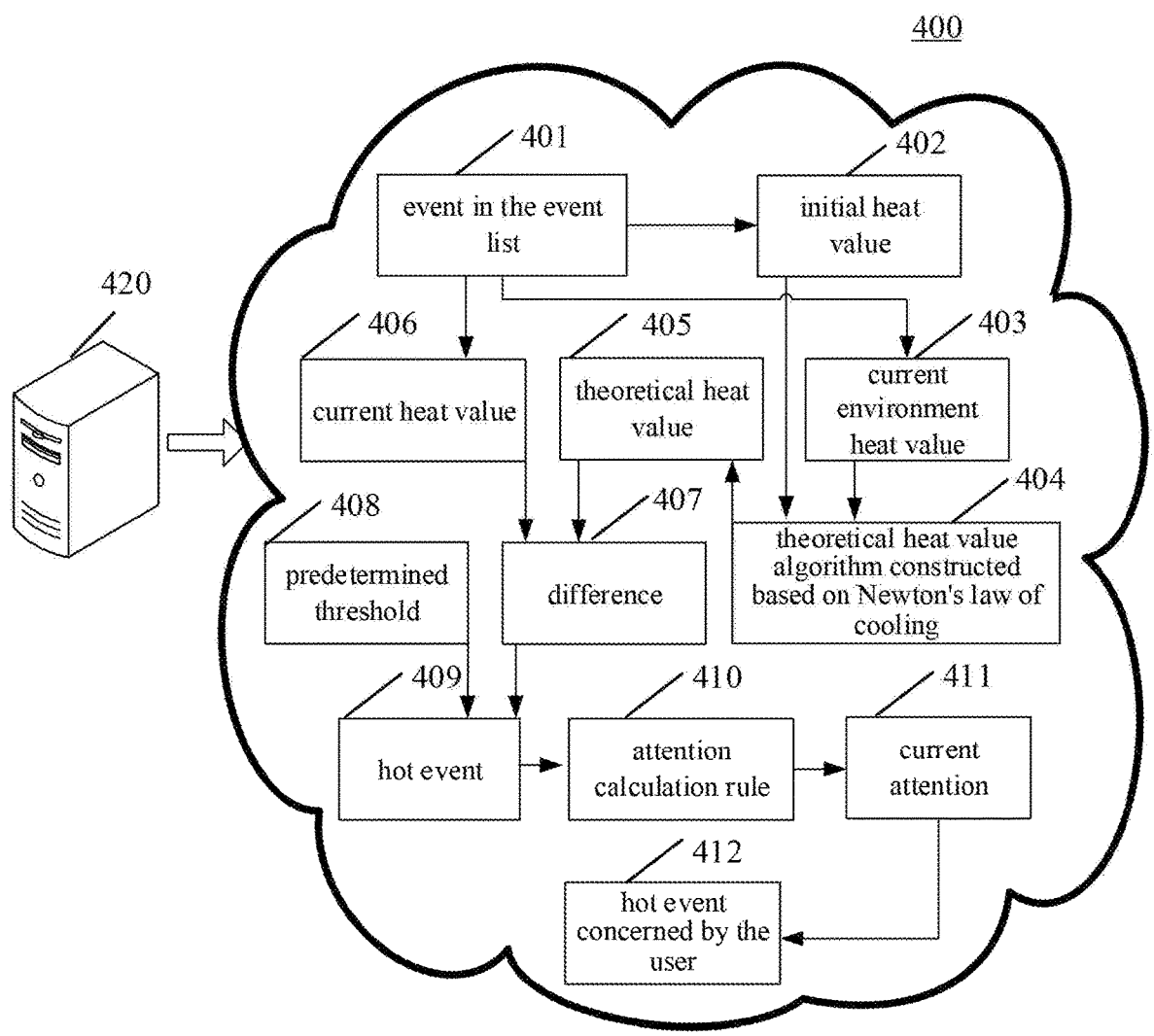
FIG. 4 is an exemplary application scenario of the method for determining a hot event according to the embodiments of the present disclosure.

With reference to FIG. 4, an exemplary application scenario of the method for determining a hot event according to the embodiments of the present disclosure is described below.

As shown in FIG. 4, the method 400 for determining a hot event is implemented in the electronic device 420, and the method includes:

acquiring an event list within a predetermined time period, the event 401 in the event list including: a time period, a keyword list, and a viewpoint list;

determining a theoretical heat value 405 of the event in the event list at the current moment based on the initial heat value 402 of the event in the event list, a current environment heat value 403, and a theoretical heat value algorithm 404 constructed based on Newton's law of cooling;

calculating a difference 407 between the current heat value 406 and the theoretical heat value 405, for the event in the event list;

determining an event having a difference 407 greater than a predetermined threshold 408 as a hot event 409;

calculating current attention 411 of the user to the event in the event list by adopting an attention calculation rule 410; and determining a hot event 412 drawing attention of the user based on the hot event 409 and the current attention 411.

It should be understood that the method for determining a hot event as shown in FIG. 4 above is merely an exemplary application scenario of the method for determining a hot event, and does not limit of the present disclosure. For example, the acquiring an event list in the predetermined time period in FIG. 4 may include: first acquiring information within a predetermined time period; and then clustering the information within the predetermined time period to obtain the event list. The method for determining a hot event provided in the above application scenario of the present disclosure may fit a past hot event propagation model, and perform an early warning for the public opinion events corresponding to entities with few concern groups in the expected escalation phase, so that the system can find events in the expected escalation phase before the events spread and perform early warning, avoiding losses caused by delay. In addition, for different user groups, the method considers the user concern and memory level for the hot events, by learning the memory simulation of the groups to the events, and avoids the event really drawing attention of the user being flooded by a large number of hot events.

Figure 5:
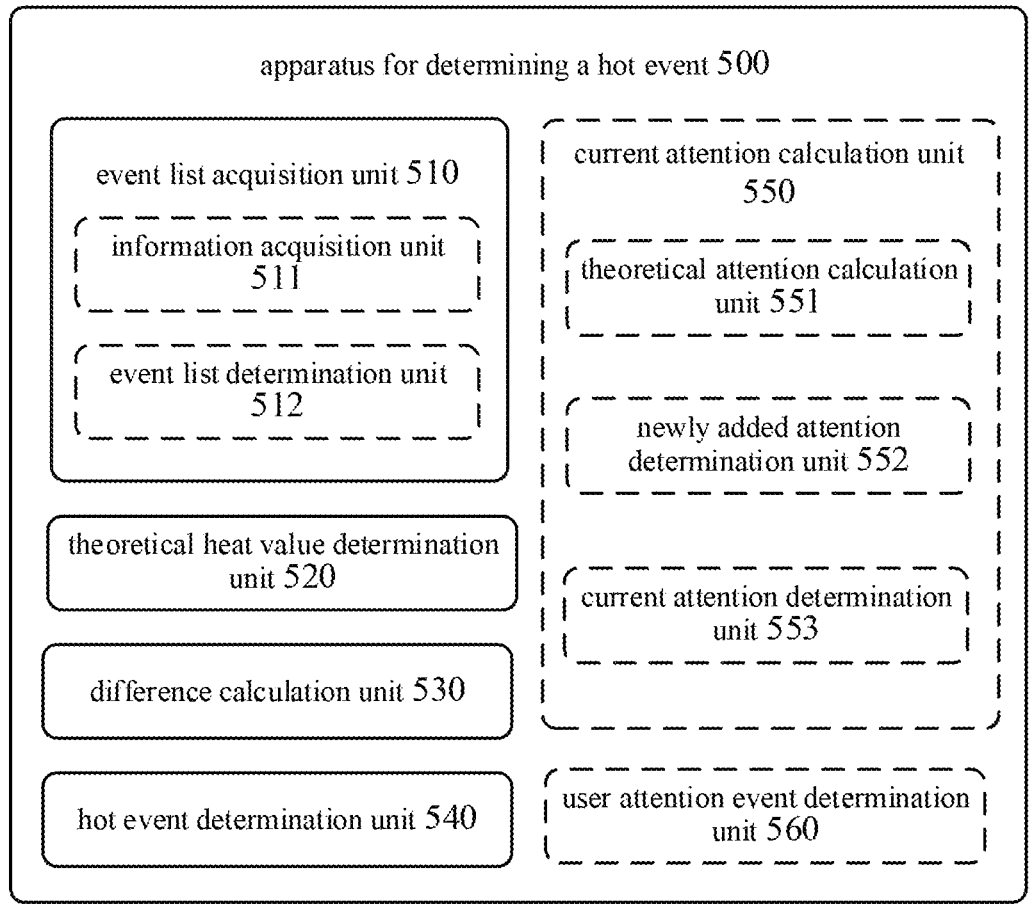
FIG. 5 is an exemplary structural diagram of an apparatus for determining a hot event according to the embodiments of the present disclosure.

With further reference to FIG. 5, as an implementation to the method, the embodiments of the present disclosure provide an embodiment of an apparatus for determining a hot event. The embodiment of the apparatus for determining a hot event corresponds to the embodiments of the method for determining a hot event as shown in FIGS. 1-4. Thus, the operations and features described above for the method for determining a hot event in FIGS. 1-4 are equally applicable to the apparatus 500 for determining a hot event and the units contained therein, and detailed descriptions thereof will be omitted.

As shown in FIG. 5, the apparatus 500 for determining a hot event includes: an event list acquisition unit 510, configured to acquire an event list within a predetermined time period, an event in the event list including: a time period, a keyword list, and an opinion list; a theoretical heat value determination unit 520, configured to determine a theoretical heat value of the event in the event list at a current moment based on an initial heat value of the event in the event list and a current environment heat value; a difference calculation unit 530, configured to calculate a difference between the current heat value and the theoretical heat value for the event in the event list; and a hot event determination unit 540, configured to determine an event having a difference greater than a predetermined threshold as a hot event.

In some embodiments, the apparatus further includes: a current attention calculation unit 550, configured to calculate current attention of a user to the event in the event list by adopting an attention calculation rule; and a user attention event determination unit 560, configured to determine a hot event drawing attention of the user based on the hot event and the current attention.

In some embodiments, the event list acquisition unit 510 includes: an information acquisition unit 511, configured to acquire information within the predetermined time period; and an event list determination unit 512, configured to cluster the information within the predetermined time period to obtain the event list.

In some embodiments, the current environment heat value used by the theoretical heat value determination unit 520 is determined based on the following steps: determining a heat value of each piece of information based on a number of operating the information within the predetermined time period; determining the current heat value of the event in the event list based on the heat value of each piece of information in each viewpoint and a weight corresponding to the piece of information; and determining a weighted sum of current heat values of all events in the event list as the current environment heat value.

In some embodiments, the theoretical heat value determination unit 520 is further configured to: determine the theoretical heat value of the event in the event list at the current moment based on the initial heat value of the event in the event list, the current environment heat value, and a theoretical heat value algorithm constructed based on Newton's law of cooling.

In some embodiments, the current attention calculation unit 550 includes: a theoretical attention calculation unit 551, configured to calculate theoretical attention of the user to the event in the event list based on an Ebbinghaus memory model of the user and initial attention; a newly added attention determination unit 552, configured to determine newly added attention of the user to the event in the event list, in response to a subsequent operation of the user on the information of the event in the event list; and a current attention determination unit 553, configured to determine, based on the theoretical attention, the newly added attention, and a preset constraint model for the newly added attention, the current attention of the user to the event in the event list at the current moment.

In some embodiments, the initial attention used by the theoretical attention calculation unit 551 is set in response to an initial operation of the user on the information of the event in the event list; and/or a forgetting speed of the Ebbinghaus memory model of the user used by the theoretical attention calculation unit 551 is determined based on an operation frequency of the user to the event and an operation type.

The present disclosure also provides an embodiment of a device, including: one or more processors; and a memory, for storing one or more programs, the one or more programs, when executed by the one or more processors, cause the one or more processors to implement the method for determining a hot event according to any one of the above.

The present disclosure also provides an embodiment of a computer readable storage medium, storing a computer program, the program, when executed by a processor, implements the method for determining a hot event according to any one of the above.

Figure 6:
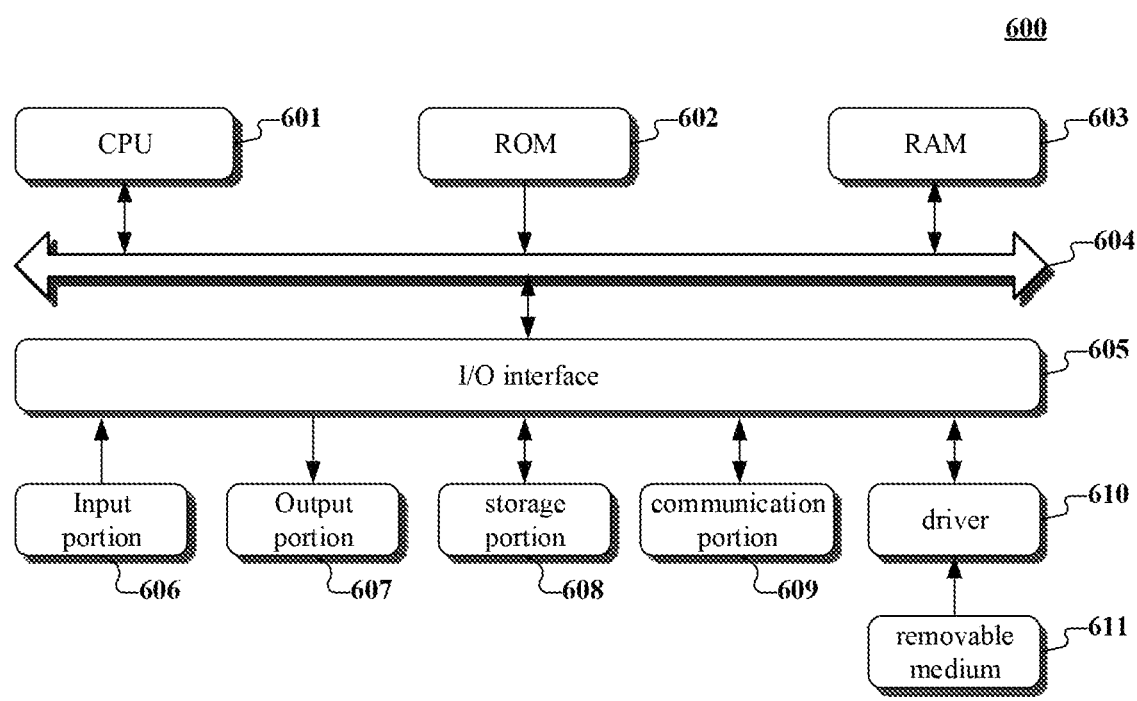
FIG. 6 is a schematic structural diagram of a computer system adapted to implement a terminal device or a server of the embodiments of the present disclosure.

Referring to FIG. 6, a schematic structural diagram of a computer system 600 adapted to implement a terminal device or a server of the embodiments of the present disclosure is shown. The electronic device shown in FIG. 6 is only an example, and should not limit a function and scope of the embodiment of the disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 including a cathode ray tube (CRT), a liquid crystal display device (LCD), a speaker etc.; a storage portion 608 including a hard disk and the like; and a communication portion 609 including a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion X08 as needed.

In particular, according to embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, including an event list acquisition unit, a theoretical heat value determination unit, a difference calculation unit, and a hot event determination unit where the names of these units do not in some cases constitute a limitation to such units themselves. For example, the blocking unit may also be described as "a unit for acquiring an event list within a predetermined time period."

In another aspect, the present disclosure further provides a non-volatile computer storage medium. The non-volatile computer storage medium may be the non-volatile computer storage medium included in the apparatus in the above described embodiments, or a stand-alone non-volatile computer storage medium not assembled into the apparatus. The non-volatile computer storage medium stores one or more programs. The one or more programs, when executed by a device, cause the device to: acquire an event list within a predetermined time period, an event in the event list comprising: a time period, a keyword list, and a viewpoint list; determine a theoretical heat value of the event in the event list at a current moment based on an initial heat value of the event in the event list and a current environment heat value, the current environment heat value being determined based on current heat values of all events in the event list; calculate a difference between the current heat value and the theoretical heat value for the event in the event list; and determine an event having the difference greater than a predetermined threshold as a hot event.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for determining a hot event, the method comprising:
    acquiring an event list within a predetermined time period, an event in the event list comprising: a time period, a keyword list, and a viewpoint list;
    determining a theoretical heat value of the event in the event list at a current moment based on an initial heat value of the event in the event list and a current environment heat value, the current environment heat value being determined based on current heat values of all events in the event list;
    calculating a difference between the current heat value and the theoretical heat value for the event in the event list; and
    determining an event having the difference greater than a predetermined threshold as the hot event.

2. The method according to claim 1, wherein the method further comprises:
    calculating current attention of a user to the event in the event list by adopting an attention calculation rule; and
    determining a hot event drawing attention of the user based on the hot event and the current attention.

3. The method according to claim 1, wherein the acquiring an event list within a predetermined time period comprises:
    acquiring information within the predetermined time period; and
    clustering the information within the predetermined time period to obtain the event list.

4. The method according to claim 1, wherein the current environment heat value is determined by:
    determining a heat value of each piece of information based on a number of operating the information within the predetermined time period;
    determining the current heat value of the event in the event list based on the heat value of each piece of information in each viewpoint and a weight corresponding to the each piece of information; and
    determining a weighted sum of current heat values of all events in the event list as the current environment heat value.

5. The method according to claim 1, wherein the determining a theoretical heat value of the event in the event list at a current moment based on an initial heat value of the event in the event list and a current environment heat value comprises:
    determining the theoretical heat value of the event in the event list at the current moment based on the initial heat value of the event in the event list, the current environment heat value, and a theoretical heat value algorithm constructed based on Newton's law of cooling.

6. The method according to claim 2, wherein the calculating current attention of a user to the event in the event list by adopting an attention calculation rule comprises:
    calculating theoretical attention of the user to the event in the event list based on an Ebbinghaus memory model of the user and initial attention;

determining newly added attention of the user to the event in the event list, in response to a subsequent operation of the user on the information of the event in the event list; and determining, based on the theoretical attention, the newly added attention, and a preset constraint model for the newly added attention, the current attention of the user to the event in the event list at the current moment.

7. The method according to claim 6, wherein the initial attention is set in response to an initial operation of the user on the information of the event in the event list; or a forgetting speed of the Ebbinghaus memory model of the user is determined based on an operation frequency of the user to the event and an operation type.

8. An apparatus for determining a hot event, the apparatus comprising:

at least one processor; and a memory storing instructions, wherein the instructions when executed by the at least one processor, cause the at least one processor to perform operations, the operations comprising:

acquiring an event list within a predetermined time period, an event in the event list comprising: a time period, a keyword list, and a viewpoint list;

determining a theoretical heat value of the event in the event list at a current moment based on an initial heat value of the event in the event list and a current environment heat value, the current environment heat value being determined based on current heat values of all events in the event list;

calculating a difference between the current heat value and the theoretical heat value for the event in the event list; and determining an event having the difference greater than a predetermined threshold as the hot event.

9. The apparatus according to claim 8, wherein the operations further comprise:

calculating current attention of a user to the event in the event list by adopting an attention calculation rule; and determining a hot event drawing attention of the user based on the hot event and the current attention.

10. The apparatus according to claim 8, wherein the acquiring an event list within a predetermined time period comprises:

acquiring information within the predetermined time period; and clustering the information within the predetermined time period to obtain the event list.

11. The apparatus according to claim 8, wherein the current environment heat value is determined by:

determining a heat value of each piece of information based on a number of operating information within the predetermined time period;

determining the current heat value of the event in the event list based on the heat value of each piece of information in each viewpoint and a weight corresponding to the each piece of information; and determining a weighted sum of current heat values of all events in the event list as the current environment heat value.

12. The apparatus according to claim 8, wherein the determining a theoretical heat value of the event in the event list at a current moment based on an initial heat value of the event in the event list and a current environment heat value comprises:

determining the theoretical heat value of the event in the event list at the current moment based on the initial heat value of the event in the event list, the current environment heat value, and a theoretical heat value algorithm constructed based on Newton's law of cooling.

13. The apparatus according to claim 9, wherein the calculating current attention of a user to the event in the event list by adopting an attention calculation rule comprises:

calculating theoretical attention of the user to the event in the event list based on an Ebbinghaus memory model of the user and initial attention;

determining newly added attention of the user to the event in the event list, in response to a subsequent operation of the user on the information of the event in the event list; and determining, based on the theoretical attention, the newly added attention, and a preset constraint model for the newly added attention, the current attention of the user to the event in the event list at the current moment.

14. The apparatus according to claim 13, wherein the initial attention is set in response to an initial operation of the user on the information of the event in the event list; or a forgetting speed of the Ebbinghaus memory model of the user is determined based on an operation frequency of the user to the event and an operation type.

15. A non-transitory computer storage medium, storing a computer program, wherein the computer program, when executed by a processor, causes the processor to perform operations, the operations comprising:

acquiring an event list within a predetermined time period, an event in the event list comprising: a time period, a keyword list, and a viewpoint list;

determining a theoretical heat value of the event in the event list at a current moment based on an initial heat value of the event in the event list and a current environment heat value, the current environment heat value being determined based on current heat values of all events in the event list;

calculating a difference between the current heat value and the theoretical heat value for the event in the event list; and determining an event having the difference greater than a predetermined threshold as a hot event.

* * * * *